(12) United States Patent
Hettish

(10) Patent No.: US 6,804,339 B1
(45) Date of Patent: Oct. 12, 2004

(54) REAL-TIME OBJECT-ORIENTED DATABASE FOR TAPI SERVICE PROVIDERS

(75) Inventor: Mark B. Hettish, Cary, NC (US)

(73) Assignee: Siemens Information and Communication Networks, Inc., Boca Raton, FL (US)

(*) Notice: Subject to any disclaimer, the term of this patent is extended or adjusted under 35 U.S.C. 154(b) by 0 days.

(21) Appl. No.: 09/487,553

(22) Filed: Jan. 19, 2000

(51) Int. Cl.[7] .............................................. H04M 3/42
(52) U.S. Cl. ........................ 379/201.01; 379/201.03
(58) Field of Search ....................... 379/201.01, 201.03, 379/211.02, 219, 229, 230, 242

(56) References Cited

U.S. PATENT DOCUMENTS

| | | | |
|---|---|---|---|
| 4,972,453 A | * | 11/1990 | Daniel et al. .............. 379/9.03 |
| 5,574,888 A | | 11/1996 | Panditji et al. |
| 5,940,488 A | | 8/1999 | DeGrazia et al. |
| 6,343,116 B1 | * | 1/2002 | Quinton et al. ........... 379/90.01 |
| 6,356,631 B1 | * | 3/2002 | Kirshnan ................ 379/201.01 |
| 6,618,476 B1 | * | 9/2003 | Szeto et al. .................. 379/198 |
| 2003/0002642 A1 | * | 1/2003 | Jorasch et al. |

FOREIGN PATENT DOCUMENTS

GB 2 341 291 * 8/2000 ............ H04M/3/42

* cited by examiner

Primary Examiner—William J. Deane, Jr.

(57) ABSTRACT

A TAPI database system and method according to the present invention. According to one implementation, an object-oriented TAPI database (200) is provided which supports code re-use when using in other TAPI service providers. The database (200) models all the major objects in TAPI telephony—static line, static phone, static addresses, open lines, open phones, open addresses, calls and request Ids.

10 Claims, 5 Drawing Sheets

REAL-TIME OBJECT-ORIENTED DATABASE FOR TAPI SERVICE PROVIDERS

RESERVATION OF COPYRIGHT

A portion of the disclosure of this patent document contains material which is subject to copyright protection. The copyright owner has no objection to the facsimile reproduction by anyone of the patent document or the patent disclosure, as it appears in the Patent and Trademark Office patent file or records available to the public, but otherwise reserves all copyright rights whatsoever.

BACKGROUND OF THE INVENTION

1. Field of the Invention

The present invention relates to communications systems and, in particular, to a communication system employing a TAPI interface.

2. Description of the Related Art

The Telephony Application Programming Interface (TAPI) is a high level programming interface for Windows™ which supports many types of telephony applications associated with conventional analog public telephone lines, PBX phone lines, ISDN phone lines, and the like. Thus, TAPI allows a communication application to support numerous telephony operations through a variety of mediums by making a function call to TAPI which will drive the hardware (fax/modem card, DSP card, network switch, and the like) coupled thereto.

The TAPI architecture 100 is illustrated in FIG. 1. As shown, the TAPI architecture 100 includes a TAPI implementation 104 interfaced to telephony application programs 102. TAPI 104 provides a connection to a TAPI service provider, such as a TAPI server 106, which then interfaces to hardware such as voice cards 108a, H.323 interfaces 108b, or PBX's 108c.

Typically, TAPI service provides have developed using non object oriented computer languages. Conventionally, for each service provider 106, a separate and unique internal control database has been developed, which results in increased development time, little code reuse, and longer test cycles.

SUMMARY OF THE INVENTION

These and other drawbacks in the prior art are overcome in large part by a TAPI database system and method according to the present invention. According to one implementation, an object-oriented TAPI database is provided which supports code re-use when used in other TAPI service providers. The database models all the major objects in TAPI telephony static—line, static phone, static addresses, open lines, open phones, open addresses, calls and request Ids.

Objects are modeled using free and in-use lists and are linked in the common TAPI relationships, allowing for quick retrieval of information from one object while accessing another object. Objects are searched using a efficient two-tiered search. Telephony objects follow a class hierarchy that allows for the efficient usage of common data and routines. Telephony objects are divided with areas for distinct sets of TAPI data, TAPI service provider data, and private TAPI data. Management objects follow a class hierarchy that allows for the efficient usage of common management data and routines and common operation upon telephony objects.

BRIEF DESCRIPTION OF THE DRAWINGS

A better understanding of the invention is obtained when the following detailed description is considered in conjunction with the following drawings in which.

DETAILED DESCRIPTION OF THE INVENTION

FIGS. 1-6 illustrate an improved TAPI database system and method. An object-oriented TAPI database is provided which supports code reuse when using in other TAPI service providers. The database models all the major objects in TAPI telephony—static line, static phone, static addresses, open lines, open phones, open addresses, calls and request Ids.

Figure 2:
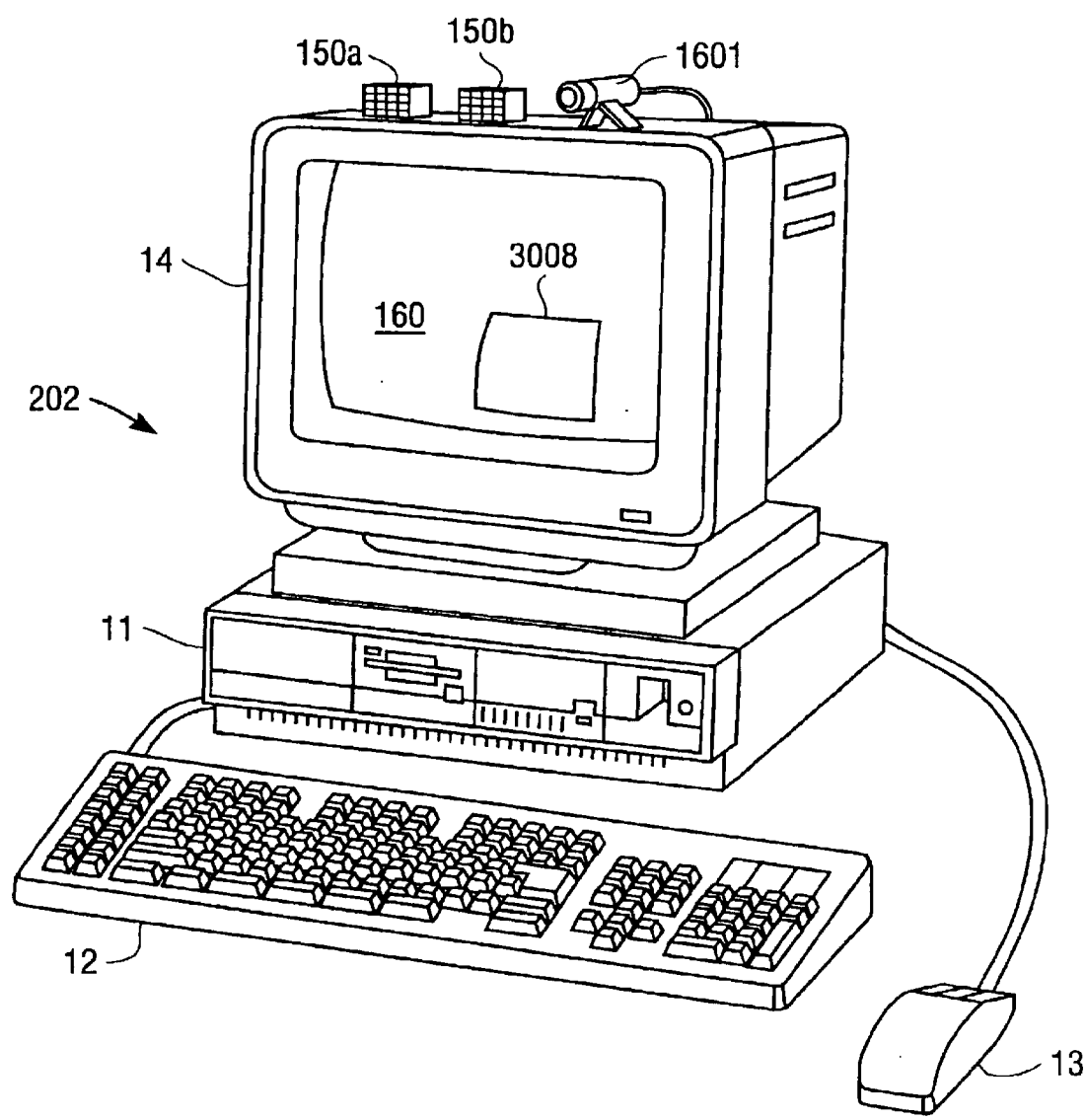
FIG. 2 is a diagram illustrating an exemplary TAPI system according to an embodiment of the invention.

An exemplary TAPI client 202 is shown in FIG. 2. The TAPI client 202 may be embodied as a personal computer, including a system unit 11, a keyboard 12, a mouse 13, and a display 140. Also shown are one or more speakers 150a, 150b, and a microphone 1601. The screen 160 of the display device 14 is used to present a graphical user interface (GUI) and particularly, a TAPI client window 3008. The graphical user interface supported by the operating system allows the user to employ a point and click method of input, i.e., by moving the mouse pointer or cursor (not shown) to an icon representing a data object at a particular location on the screen 160 and pressing one or more of the mouse buttons to perform a user command or selection. The GUI may be any of the Windows GUIs available from Microsoft Corporation or the Macintosh OS, available from Apple Computer.

Figure 3:
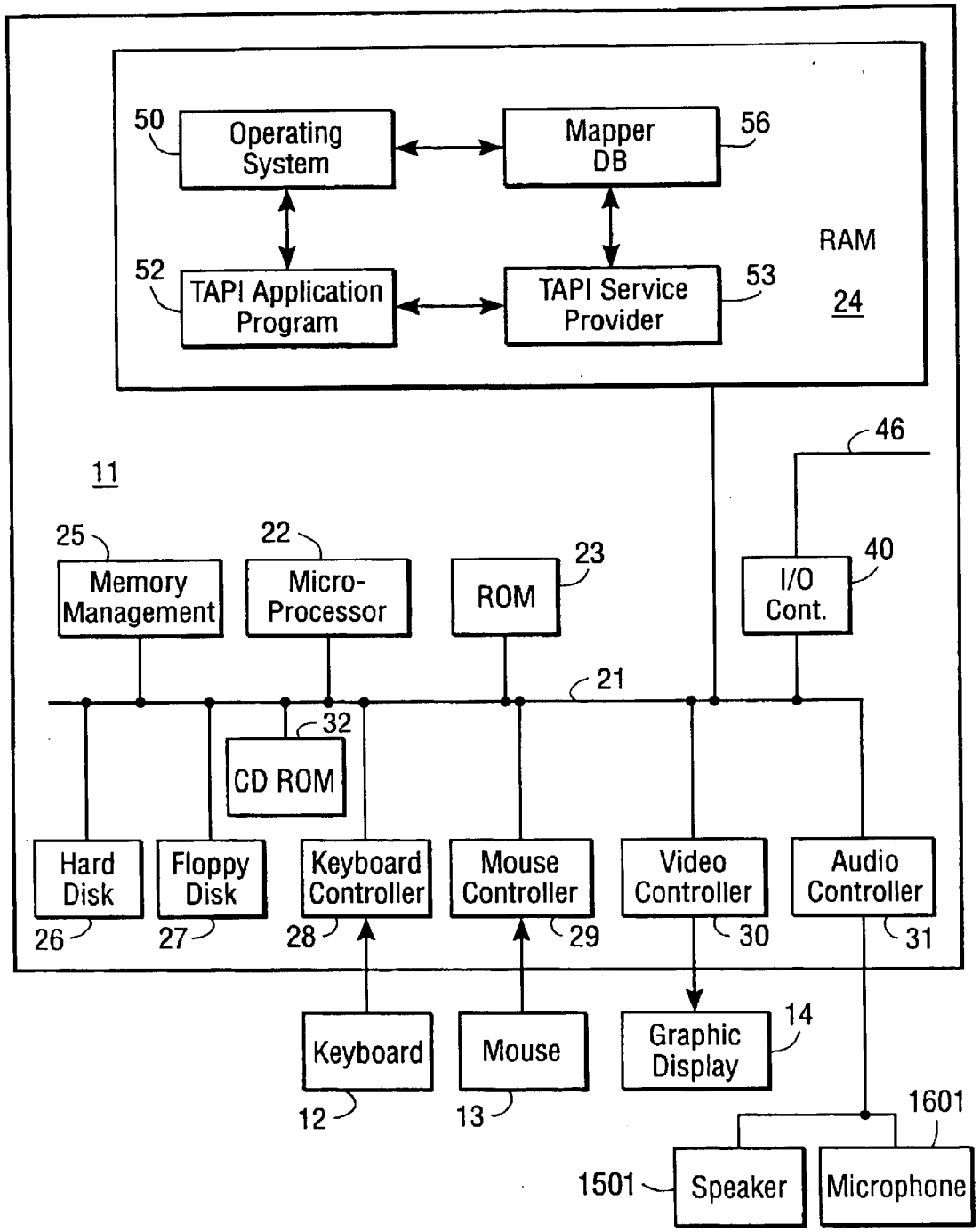
FIG. 3 is a block diagram illustrating the system of FIG. 2 in greater detail.

FIG. 3 shows a block diagram of the components of the personal computer shown in FIG. 2. The system unit 11 includes a system bus or a plurality of system buses 21 to which various components are coupled and by which communication between the various components is accomplished. The microprocessor 22 is coupled to the system bus 21 and is supported by the read only memory (ROM) 23 and the random access memory (RAM) 24 also connected to the system bus 21. The microprocessor 22 may be embodied as any of a variety of microprocessors, including Intel x86, Pentium or Pentium II or compatible processors.

The ROM 23 contains among other code the basic input output system (BIOS) which controls basic hardware operations such as the interaction of the disk drives and the keyboard. The RAM 24 is the main memory into which the operating system and applications programs are loaded. The memory management chip 25 is connected to the system bus 21 and controls direct memory access operations including passing data between the RAM 24 and hard disk drive 26 and floppy disk drive 27. A CD ROM drive (or DVD or other optical drive) 32 may also be coupled to the system bus 21 and is used to store a large amount of data, such as a multimedia program or a large database.

Also connected to the system bus 21 are various I/O controllers: The keyboard controller 28, the mouse controller 29, the video controller 30, and the audio controller 31. The keyboard controller 28 provides the hardware interface for the keyboard; the mouse controller 29 provides the hardware interface for the mouse 13; the video controller 30 is the hardware interface for the video display 14; and the audio controller 31 is the hardware interface for the speakers 15 and microphone 16. The speakers 150a, b and the microphone 1601 allow for audio communication during telephony operation. In operation, keyboard strokes are detected by the keyboard controller 28 and corresponding signals are transmitted to the microprocessor 22; similarly, mouse movements and button clicks are detected by the mouse controller and provided to the microprocessor 22. Typically, the keyboard controller 28 and the mouse controller 29 assert interrupts at the microprocessor 22. In response, the microprocessor 22 executes a corresponding interrupt routine, as is known. Additionally, an interrupt controller (not shown) may be provided to arbitrate among interrupt requests.

An I/O controller or network interface 40 enables communication over a network 46, such as a packet network. More particularly, the I/O controller 40 may be an H.323 Recommendation interface, or other interface to allow for telephony or multimedia communications via the packet switched network 101, as will be explained in greater detail below.

One embodiment of the present invention is as a set of instructions in a code module resident in the RAM 24. Until required by the computer system, the set of instructions may be stored in another computer memory, such as the hard disk 26, on an optical disk for use in the CD ROM drive 32, or a floppy disk for use in the floppy disk drive 27.

As shown in the figure, the operating system 50, the TAPI application 52, the TAPI service provider 53 and the mapper DB 56 are resident in the RAM 24. As is known, the operating system 50 functions to generate a graphical user interface on the display 14. The TAPI application program 52 performs TAPI functionality, including generation of a TAPI client window 3008 (FIG. 2) in the GUI. The function of the mapper DB is described in greater detail below.

Figure 1:
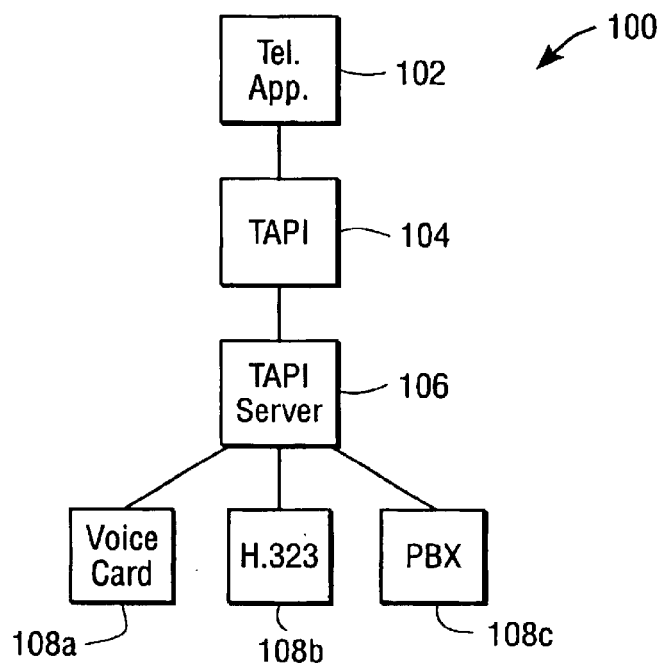
FIG. 1 is a diagram representative of the TAPI architecture.
Figure 4:
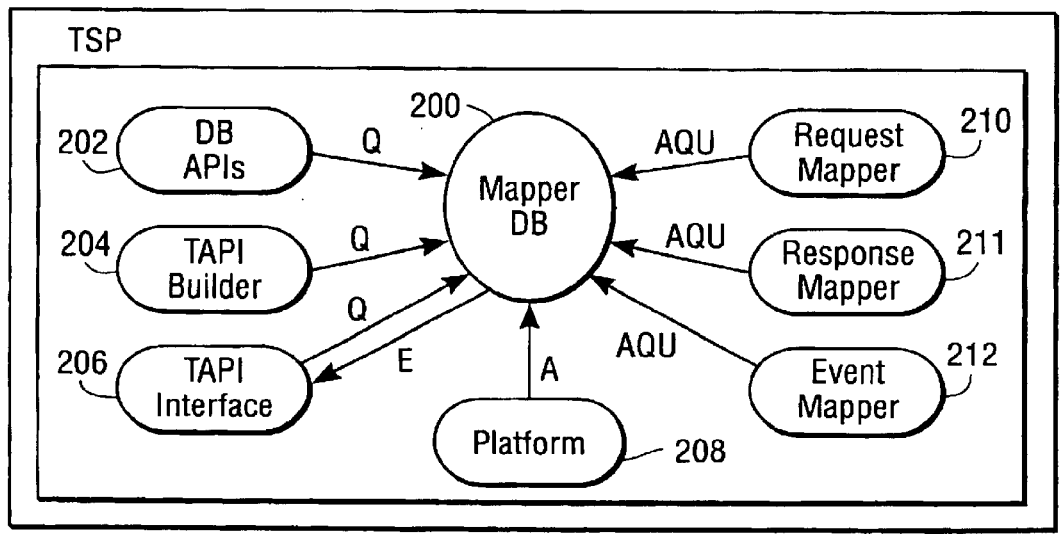
FIG. 4 is a diagram illustrating mapper architecture according to an embodiment of the invention.

The mapper DB according to the present invention centralizes all information needed to support the TAPI telephony model and the mapping between the ACL and TAPI. Turning now to FIG. 4, a diagram illustrating mapper architecture in a TAPI service provider is shown. In particular, illustrated are the mapper DB 200, one or more DB APIs 202, a TAPI builder 204, a TAPI interface 206, the platform 208, one or more request mappers 210, one or more response mappers 211, and one or more event mappers 212.

The TAPI builder 204 obtains information from the TAPI DB 200 to build various data structures that can be returned to TAPI. The TAPI interface 206 queries the mapper DB 200 to obtain any needed information, and receives TAPI events from the mapper DB 200. The TAPI events are those related to creation/deletion or opening/closing of TAPI telephony objects such as lines, phones, and calls.

The platform components 208 may request certain actions of the mapper DB 200. Such actions include the closing of all open lines/phones due to the pending removal of the TAPI service provider or possibly a link restart. The actual interface may be from the platform 206 to one of the mapper components 210, 212, 214 but logically the platform 206 makes the request of the mapper DB 200.

Each of the mapper components, the Request Mapper 210, Response Mapper 212 and Eve Mapper 214, perform actions on the mapper DB 200, query for information from the mapper DB 200, and update information within the mapper DB 200. The actions performed include the creation/deletion and opening/closing of TAPI telephony objects such as lines, phones and calls. For example, the Event Mapper 214 may request the mapper DB 200 to create a new call on a specified address.

Further, the mapper components 210, 212, 214 make queries that pertain to information about the TAPI telephony objects. This information can be related to static device information (e.g. device type) to transient TAPI telephony information (e.g. state of a call) to transient related information (e.g. call ID of a call). The mapper components 210, 212, 214 also update information about the TAPI telephony objects. The information that is updated pertains to both TAPI telephony information and vendor device related information.

Figure 5:
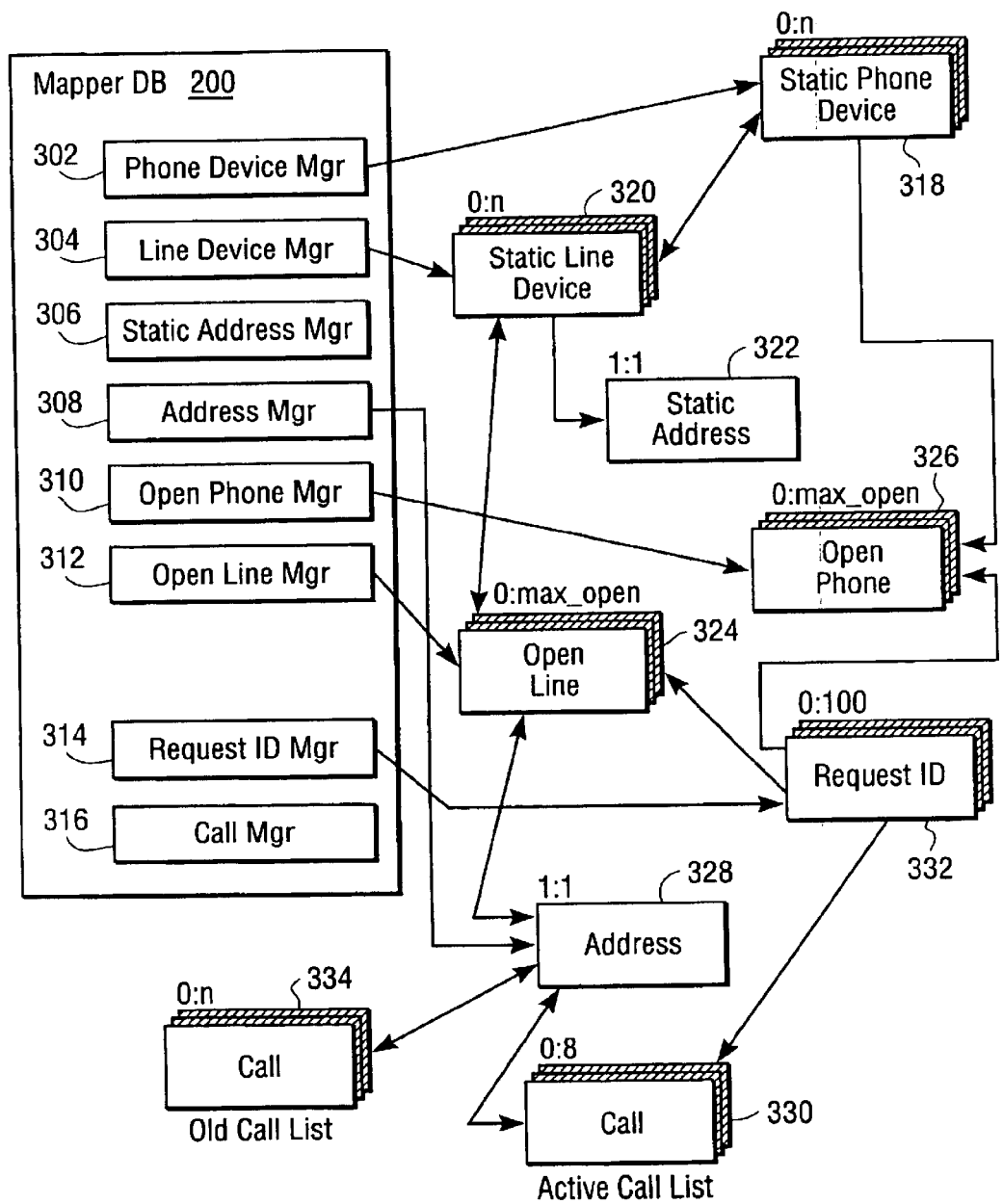
FIG. 5 is a diagram illustrating mapper DB object organization according to an embodiment of the present invention.

The mapper DB is supported by a number of objects: the mapper DB object, manager objects, TAPI telephony objects, and data objects. FIG. 5 illustrates mapper DB object organization. The mapper DB 200 includes a phone device manager object 302, a line device manager object 304, a static address manager object, an address manager object 308, an open phone manager object 310, an open line manager object 312, a request ID manager object 314, and a call manager object 316.

As will be explained in greater detail below, the various mapper manager objects mange the various objects. The managed objects include static phone devices 318, static line devices 320, static addresses 322, open lines 324, open phones 326, addresses 328, calls 330, and request Ids 332. Static phone device objects 318 include the static data that pertains to a phone. The static line device objects 320 contain the static data that pertains to a line. Static address objects 322 relate to the static data that pertains to an address on a line. The open line objects 324 include the dynamic data that pertains to an open line. The open phone objects include the dynamic data that pertains to an open phone. The address objects 328 include the dynamic data that pertains to an address on an open line. Call objects 330 contain the dynamic data that pertains to a call. Request ID objects 332 contain the dynamic data that pertains to an outstanding asynchronous request.

The phone device manager object 302 manages the list of static phone device objects 318. There may be from 0 to n static phone device objects 318, n being the number of devices received from the PBX device list query. The phone device manager object 302 is also responsible for allocating and freeing static phone device objects 318.

The line device manager object 304 manages the list of static line device objects 320. There may be from 0 to n static line device objects 320, n being the number of devices received from the PBX device list query. The line device manager object 304 is also responsible for allocating and freeing objects of this type.

The open phone manager object 310 manages the list of open phone objects 326. There may be from 0 to max_open open phone objects 326, max_open being the hard limit for the number of device monitors that the customer has purchased. The open phone manager object 310 is also responsible for allocating and freeing open phone objects 326 and for providing the unique ID of the object every time the object is put into use.

The open line manager object 312 manages the list of open line objects 324. There may be from 0 to max_open open line objects 324, max_open being the hard limit for the number of device monitors that the customer has purchased. The open line manager object 312 is also responsible for allocating and freeing objects of this type and for providing the unique ID of the object every time the object is put into use.

The request ID manager object 314 manages the list of request ID objects 332. A request ID object 332 exists when a device has an outstanding request associated with it. There may be from 0 to 100 request ID objects 332. The upper limit is set by the number of ACL reference IDs possible. As well as being associated with a device, a request ID may also be associated with a call from the active call list. The request ID manager object 314 is also responsible for allocating and freeing request ID objects 332.

The call manager object 316 manages the free list of call objects. It is responsible for providing the unique ID of the object every time the object is put into use.

The static line device objects 320 represent the static data associated with a line device. One static line device object exists for each monitorable device returned from the PBX. The static line device object points to other static line device objects to form the list managed by the line device manager 304. The static line device objects also point to associated static phone device objects 318 and, in particular, to the phone representation of the line. The static line device objects 320 also point to associated static address objects 322, and, in particular, to the address representation of this line. Finally, the static line device objects 320 point to associated open line objects 324, which are created and associated when a line is actually opened.

The static address objects 322 represent the static address data associated with a line. The static address objects 322 also point back to the associated static line objects 320.

The static phone device objects 318 represent the static data associated with a phone device. One static phone device object 318 exists for each monitorable device returned from the PBX. The static phone device objects 318 point to other static phone device objects to form the list managed by the phone device manager 302. The static phone device objects 318 also point to a an associated static line device object 320, which is the line representation of the phone. Finally, the static line device objects 320 point to an open phone object 326, which is created and associated when a phone is actually opened.

The open line object 324 represents the dynamic data associated with an open line. One open line object 324 exists for each line that has been opened. The open line objects 324 point to other open line objects to form the list managed by the open line manager 312. The open line object 324 also points to an address object 328, which represents the associated dynamic address data for this open line. The open line object 324 also points back to the associated static line device object 320. When in use, the open line object 324 has a unique ID associated with it The open phone object 326 represents the dynamic data associated with an open phone. An open phone object 326 exists for each phone that has been opened. The open phone object 326 points to other open phone objects to form the list managed by the open phone manager 310. The open phone object 326 also points back to the associated static phone device object 318. When in use, the open phone object 326 has a unique ID associated with it.

The address object 328 represents the dynamic address data associated with an open line. The address object also points to a list current 330 and a list of old call objects 334 that represent calls associated with the address object 328. The address object 328 also points back to the associated open line object 324.

The call object 330 represents the dynamic state of a call. Call objects can appear in two different lists but only within a single list at a time. Call objects can appear in the active call list 330, a list that is pointed to by an address object 328. On the active list, call objects represent the calls associated with an address. The call objects will point to the other call objects in the list. The call objects will also point back to the associated address object 328. Call objects can appear in an old call list 334, a list that is pointed to by an address object 328. Old call objects are not deleted by the TSP until the TAPI application deallocates the call. Thus, the upper size of this list is unbounded. When in use, the call objects have a unique ID associated with them.

The request ID object 332 represents an outstanding asynchronous request on a line or phone. The request ID object 332 points to other request ID objects 32 to form the list managed by the request ID manager 314. The request ID objects 332 also point to either an open line object 324 or open phone object 326, indicating that the pointed-to object is involved in an asynchronous request. The request ID object 332 may also point to a call object if the request is associated with a call.

Many of the TAPI telephony objects mentioned above will also contain objects that will represent groupings of data within these objects. These data objects can be obtained by the users of the database to query and set information within the TAPI telephony data objects themselves. The basic premise is that each TAPI telephony object has several groups of data associated with it. First, each object may have one or more TAPI data structures associated it. For example, a Static Phone Device object must keep the information necessary to complete a TAPI PHONECAPS structure. Secondly, certain objects may need to support device specific extensions that are not TAPI data structure extensions, but are data structures in their own right. This will be another data grouping within the object Finally, TAPI telephony objects will also need to store information that pertains to the mapping between ACL and TAPI. This information will be defined by the various TSP components and will be another data grouping within the object which will be called the system information area.

For the TAPI data areas, the object returned will allow direct access to the exact TAPI data structure definition. That is, the public data areas of the returned objects will contain the TAPI definitions of the data structures exactly as they appear in the file TAPI.H. In these data structures, strings and other variable sized data are tacked onto the end of the structure and length and offset fields in the main structure are used to indicate where the data resides and how long it is. To make it easier for the users, all strings and variable sized data handled this way can be queried or set using methods that the object will provide. The data groupings for the device specific information and the internal mapping specific information will be handled in a similar manner. Direct access is used where it is straightforward and object provided methods are used where it is not Operations that manage these TAPI telephony objects place at the database object interface. Routines are available to allow a caller to perform the following operations: obtain an open line object and open address object given an extension; obtain an open phone object given an extension; obtain a static line object given a device ID; obtain a static phone object given a device ID; set the device ID base for lines and phones; obtain the number of line devices supported; obtain the number of phone devices supported; create an open line object; create an new open phone object; delete an open line device object; delete an open phone device object, create a call object; delete a call object; move a call object to the old call list; create a new list of static line and phone device objects; update the list of static line and phone device objects; close all open devices objects; process link down condition on all open devices; process link up condition on all open devices; process a messages lost condition for all devices; lock an open line object; lock an open phone object; create a request ID object; delete a request ID object; validate an object; and convert open line, open phone and call object pointers to/from associated TAPI handles.

If any of the requests above result in the creation/deletion or opening/closing of an object then an event may need to be sent to TAPI from the database object. Events may also be sent when processing and of the link status conditions on all devices.

The following events may be sent by the mapper DB to TAPI:

LINE_NEWCALL—upon the creation of a call object (if requested)
LINE_CLOSE—when a line is closed (if requested)
LINE_CREATE—when a line is created
LINE_REMOVE—when a line is removed
LINE_LINEDEVSTATE—when status changed due to link conditions
PHONE_CLOSE—when a phone is closed (if requested)
PHONE_CREATE—when a phone is created
PHONE_REMOVE—when a phone is removed
PHONE_STATE—when status changed due to link conditions
ASYNC_COMPLETION—failure indications sent for outstanding requests on closes.

Besides the above described operations that can occur at the database level, certain operations can take place at the TAPI telephony object level:

From a static line object, get the device ID, get the number of addresses on this line.
From a static phone object, get the device ID.
From a static address object, get the extension number.
From the open line object, set/get the line event function callback pointer, setget the TAPI line handle, set/get the TAPI line states, set/get the TAPI address states, given an address name get the address ID, get the unique ID of the open line object.
From an open phone object, set/get the phone event function callback pointer, set/get the TAPI phone handle, set/get the TAPI phone states, get the unique ID of the open phone object.
From an address object, move call object to the old call list, get the number of active calls, get the extension number
From a call object, get the address ID, set/get the TAPI call handle, get the unique ID of the call object.

Each of the TAPI telephony objects is associated with other related TAPI telephony objects. Methods are provided to support these relationships. All objects will support obtaining the next like object in the list. In addition, the following relationships are supported:

From a static line device, the associated static address, static phone device and open line device can be obtained
From a static phone device, the associated static line device and open phone device can be obtained
From a static address object, the associated static line device
From a line, the associated phone, address and static line objects can be obtained
From a phone, the associated line and static phone objects can be obtained
From an address, the associated line object and first call object in each supported call list (calls, old calls) can be obtained
From a call, the associated address object can be obtained In addition, as will be described in greater detail below, the TAPI telephony objects have subordinate data objects available to the users of the mapper DB. These data objects are obtained from the TAPI telephony data objects.

Figure 6:
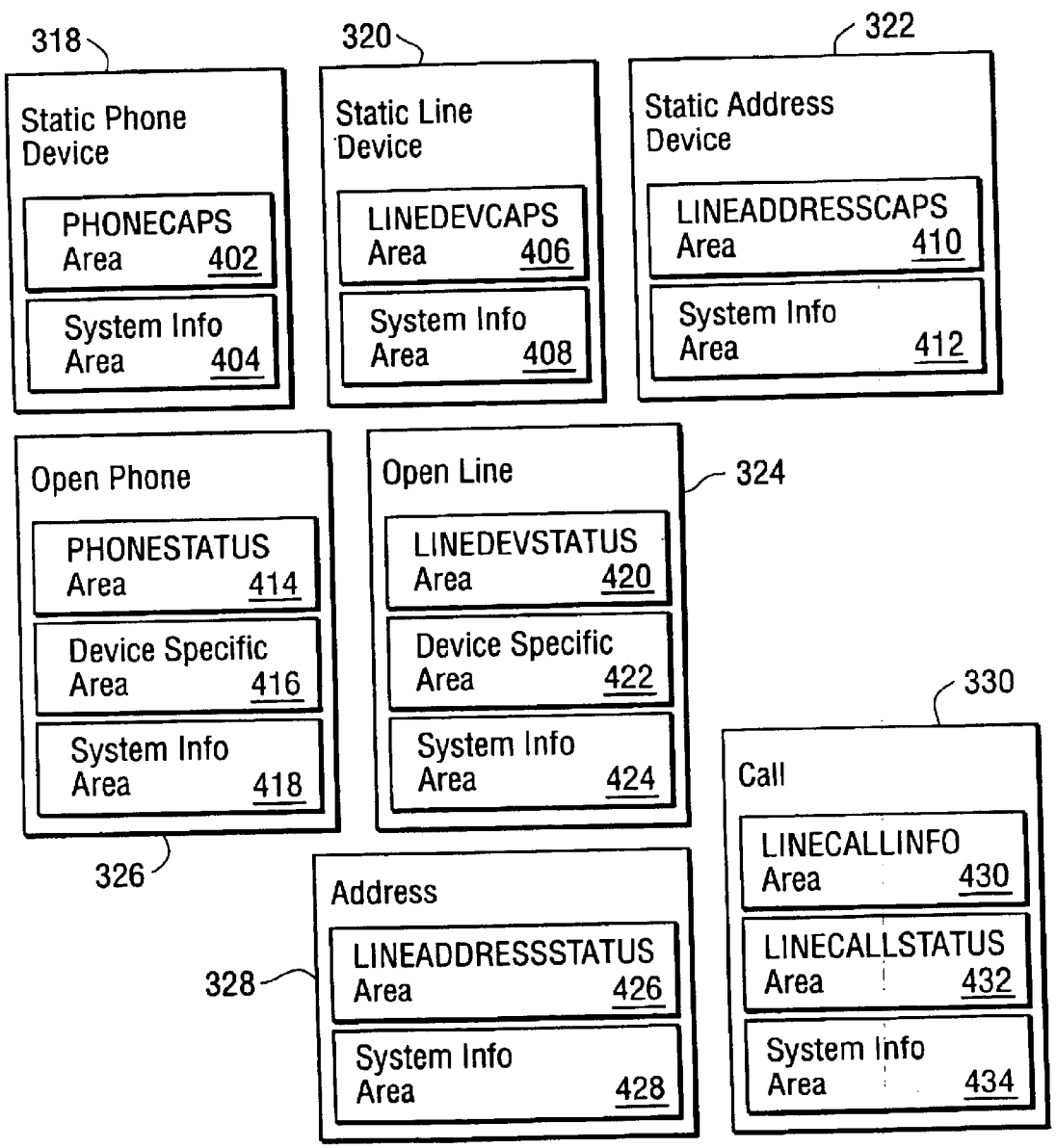
FIG. 6 is a diagram of data object organization according to an implementation of the invention.

FIG. 6 illustrates the data objects within the respective TAPI telephony objects. The static phone device object 318 includes a PHONECAPS area 402 and a System Information Area 404. The public area of the static phone device object 318 contains the TAPI PHONECAPS data structure. Access methods are provided to support provider info, switch info, phone info, and phone name variable length data. The static line device object 320 includes a LINDEVCAPS area 406 and a System Information Area 408. The public area of static line device object 320 contains the TAPI LINEDEVCAPS data structure. Access methods support the following variable length data: provider info, switch info, line name, as well as device specific data.

The Static Address Device object 322 includes a LINEADDRESSCAPS area 410 and a System Information area 412. Access methods support address data and device specific data. The Open Phone object 326 includes a PHONESTATUS area, device specific area 416 and system information area 418. Access methods are provided to support display data.

The Open Line object 324 includes a LINEDEVSTATUS area 420, device specific area 422, and system information area 424. The device specific area 422 supports ASCII dialable variable length data strings. The Address object 328 includes a LINEADDRESSSTATUS area 426 and a system information area 428. The forward variable length data is supported. The Call object 330 includes a LINECALLINFO area 430, LINECALLSTATUS area 432, and System Information Area 434. Access methods will be provided to support the following variable length data: caller ID, caller ID name, called ID, called ID name, connected ID, connected ID name, redirection ID, redirection ID name, redirecting ID, redirecting ID name.

As noted above, four basic types of objects are provided: the Mapper DB object, which is the overall mapper DB and interface; the manager objects, used to manage the TAPI telephony objects; the TAPI telephony objects, used to model TAPI telephony; and the data objects, used to hold various data within the TAPI telephony objects.

Mapper DB Object

The Mapper DB objects is a single level object not based on any abstract classes. The Mapper DB object operates on the device_list class, which represents the list of monitorable devices that is obtained from the PBX. It is used to build the portion of the mapper DB that is concerned with static lines, phones, and addresses.

The class mapper_db provides a set of centralized routines to control the TAPI telephony objects within the database. The method mapper_db is the constructor and is declared a private method. The method initializes all free lists via manager objects and sets the internal states of the objects to valid or not.

The class mapper_db includes the following public methods: ~mapper_db, create_open_device, delete_open_device, create_call, delete_call, move_call_to_old_call_list, get_static_device, get_num_line_devices, get_num_phone_devices, set_device_id_base, get_ open_device, lock_open_device, unlock_open_device, create_request_id, delete_request_id, close_all_devices, process_link_down, process_link_up, process_messages_lost, create_devices, update_devices, validate, handle_to_object, and object_to_handle.

The method ~mapper_db is the destructor for the class. The method ~mapper_db returns any resources used by the class. The method create_open_device creates an open line or open phone object. It is responsible for requesting an open_line object from the open_line manager and associating the open_line object with the static_line object. Similarly, it is responsible for requesting an open_phone object from the open phone manager and associating the open_phone object with the static_phone object.

The method delete_open_device deletes an open line or open phone object. The basic responsibilities of this method for openline device deletion are to send out failed messages for any outstanding asynch requests; return all associated request ID objects to the Request ID Manager; free all associated ACL refids; return all call objects to the Call Manager; return open_line object to Open Line Manager; and set passed in pointer to NULL. The basic responsibilities of this method for open_phone device deletion are to send out failed messages for any outstanding asynch requests; return all request ID objects to the Request ID Manager; return open_phone object to Open Phone Manager; and set passed in pointer to NULL.

The create_call method creates a call object and associates it with the given address object. The create_call method is responsible for requesting a call object from the call manager; adding a call object to the list of calls in the address object; and sending LINE_NEWCALL event if indicated by input parameter.

The delete_call method deletes a call object. The delete_call method has the following responsibilities: send out failed messages for any outstanding asynch requests; return all associated request ID objects to the Request ID Manager; free all associated ACL refids; call object removal from any lists it exists on; and return call object to Call Manager.

The move_call_to_old_call_list method moves a call object to the old call list. The method is responsible for removing the call object from the active call list to the old call list.

The get_static_device method returns a pointer to the associated static line or static phone device when given a device ID. The get_num_line_devices method returns the number of line devices that the PBX has told the TSP that it supports. The get_num_phone_devices returns the number of phone devices that the PBX has told the TSP that it supports. The set_device_id_base method sets the TAPI defined base numbers for the line and phone devices.

The get_open_device method returns a pointer to the associated open line or phone when given an extension. It is responsible for return a pointer to the found open_line or open_phone object. If it is a line object, the method returns the associated address object.

The lock_open_device method locks the specified open line or open phone. If the object is available, the method will lock it. If not, it will wait for lock. The method will return indication of either success or timeout. Similarly, the unlock_open_device method will unlock the object.

The create_request_id method creates a request ID object and associates it with the given device object. The method obtains a Request ID object from the Request ID Manager and associates the Request ID with the user request ID, TAPI request ID, open_device object and call object. The delete_request_id method deletes a request ID object.

The method returns the Request ID object to the Request ID Manager, returns the TAPI request ID to the caller; returns the open device pointer to the caller; and returns the call object pointer or NULL to the caller.

The close_all_devices method closes all open line and phone devices. This includes, for each device, cleaning up any active calls (lines only), sending failure indications for any outstanding asynch requests to TAPI, and finally sending a close message to TAPI. For a line device, the method will clean up any active calls, sending state changes as necessary, and then return the call objects to the Call Manager. For outstanding asynch events, the method will send a failure indication to TAPI and then return the Request ID objects to the Request ID manager. Further, the method will send a close message to TAPI, return the device object to its object manager, and peg statistics.

The process_link_down method is called when link has transitioned from up to down. The method sends state change messages for all open devices. For an open line device, the method sends a state change message indicating an out of service condition. For an open phone device, the method sends a state change message indicating a suspended condition. In both cases, the method will peg statistics. The process_link_up method is called when link has transitioned from down to up. Sends state change messages for all open devices. For an open line device, the method will send a state change message indicating an in service condition. For an open phone device, the method sends a state change message indicating a resume condition. In both cases, the method will peg statistics.

The process_messages lost method is called to peg statistics.

The create_devices method internally create all the static line and phone objects when given a device list. For each device list entry, the method will create a static line device and static subordinate static address object; create a static phone device object; fill in all default static information for each object; fill in static information that is based upon device type; and increment the line and phone device counts.

The update_devices method internally updates all the static line and phone objects and inform TAPI of any changes, when given a device list. For each new device list entry, the method will create a static line device and subordinate static address object; create a static phone device object; fill in all default static information for each object; fill in static information that is based upon device type; mark the devices as being temporary devices; send a line and phone create message to TAPI; and increment the line and phone device counts. For each current device not in the new device list the method will send a line and phone remove message to TAPI. If line and or phone is open, follow scenario in close devices method. Further, the method will return static line and static phone object to their respective object managers and decrement the line and phone device counts.

The validate methods validate the mapper DB object, the object pointed to, an open line, open phone or call object.

The handle_to_object method takes a TAPI handle and convert it to the appropriate object pointer. An object is validated before its pointer is returned. Thus, the method will find the object associated with the given handle, validate the object, and return the valid object or NULL. The object_to_handle methods take an object pointer and convert it to a TAPI handle. The method will find the object associated with the given pointer, validate the object, and return the valid TAPI handle or INVALID_HANDLE.

The class device_list provides a place to build a device list to give to the mapper DB. The class device_list includes the methods init, validate, add_device, get_next_device, create_differences, get_raw_format_size, get_device_list_in_raw_format, and set_device_list_from_raw_format.

The init method initializes the object, i.e., restores the object to its initial condition. Any previous device list data is destroyed. The validate method is used to see if the given device list is valid. The method returns TRUE if the device list is not empty.

The add_device method adds the given device and type to the device list. The get_next_device method obtains the next device from the device list object The method will return the next device, its type, its permanent line ID and its permanent phone ID. The method will return TRUE if a device is returned, FALSE if the list has been exhausted.

The create_differences method takes a new device list, compares it to the current device list and produces two new device lists, an added list and a deleted list. The get_raw_format_size method tells the caller how much memory is needed to hold the raw format of the device list. The get_device_list_in_raw_format method gets the device list as a stream of bytes to allow archiving. The method checks to see if data will fit and copies data out. The set_device_list_from_raw_format sets the device list from a stream of bytes to allow restoration and thus copies data in.

Manager Objects

All TAPI objects are managed via TAPI object managers. This management mostly involves moving the objects amongst two lists—a free list and an in-use list. Note that not all objects are kept in an in-use list (calls, addresses and static addresses). There is one specific TAPI object manager for each of the TAPI objects: static lines, static phones, open lines, open phones, static addresses, addresses, calls and request IDs.

The TAPI object manager base class provides routines to manage removing and adding to the in-use and free lists. Specific management classes for each type of object are derived from this base class. The specific object manager adds the responsibility of populating the free list when necessary and keeping the specific global statistics updated.

All object management follows the same basic management technique. All free lists start out empty. When a request is made and the free list is empty, the specific manager instantiates a number of new objects of the specific populate the free list with these objects. As objects are removed from the in-use lists, they go back to the free list.

Each object manager has the same methods: add_to_in_use_list, add_to_free_list, remove_from_in_use_list, remove_from_free_list, get_first, get_in_use_count, get_free_count, find.

The add_to_in_use_list method adds to the in-use list. The add_to_free_list method adds to the free list. The remove_from_in_use_list method removes from the in use list. The remove_from_free_list method removes from the free list. The get_first method gets the first object in the in use list. The get_in_use_count method gets the number o items on the in use list. The get_free_count method gets the number of items on the free list.

The find method finds an object by primary extension. The main search is done using a single LONG value called the "quick key." The value stored here is the numeric representation of the lower 7 digits of the true extension number. In a non-EPNP system, the quick key match will always be the correct value. In an EPNP system it will not. Because of this, if the quick keys match THEN the true extension strings are compared. The quick key value is set into the open phone object when this object is "created" in mapper_db::create_open_device( ).

To increase performance, caching provided. The cache is simply a table of the most recent CACHE_SIZE entries. The cache has two related tables, one that contains the search value (quick key), and a corresponding table that contains a pointer to the related object. An object is placed in the cache when added to the in-use list and removed from the cache when removed from the in-use list.

TAPI Telephony Objects

The creation, deletion and general management of telephony objects is internal to the mapper DB. However, these objects provide methods and data that are accessible to users of the mapper DB. These methods and data are used by the callers to manage TAPI telephony within this TSP.

The TAPI telephony objects include the following classes: static_device, static_line, static_phone, static_address, open_device, open_line, open_phone, address, call, and request_id.

The static_device class is the base class for static lines and phones. The static_line class is derived from static_device and represents a monitorable line on the PBX within the TSP. The static_phone class is also derived from static_device and represents a monitorable phone on the PBX within the TSP.

The static_address class represents the static information of all addresses on a static_line. In one implementation, each static_line has one static address.

The open_device class is the base class for open lines and phones. The open_line class is derived from open_device and represents an open line. The open_phone class is also derived from open_device and represents an open phone.

The address class represents the dynamic information of all addresses on a open_line. In one implementation, each open_line has one address.

The call class represents a call. An address can have a list of active call objects and a list of old call objects.

The request id class is internal to the mapper DB and is never accessed directly by the callers of the mapper DB. It represents a TAPI request ID and internally is associated with the open_device (open_line or open_phone) that initiated the TAPI request. It may also be associated with a call.

Class Static_Line

This class provides the routines needed to operate on a static line device object. All constructors and the destructor are private methods with friend status granted to the appropriate internal mapper DB objects. The class includes the following public methods: get_static address, get_devices_id, get_num_address, get_static_phone, get_open_line, get_next, get_linedevcaps, and get_siemens_data.

The method get_static_address obtains the first associated static address object in the static address list. The method returns a pointer to the head of the associated static_address list. The get_device_id method obtains the associated device ID. The get_num_addresses method obtains the number of addresses associated with this static line. The get_static_phone method obtains the associated static phone object. The get_open_line method obtains the associated open line object. The get_next method obtains the next static line device in the list of static line devices. The get_linedevcaps method obtains the TAPI LINEDEVCAPS object associated with this object. The get_siemens_data method obtains the Siemens data object associated with this object.

Class Static_Phone

The static phone class provides the routines needed to operate on a static phone device object. All constructors and the destructor are private methods with friend status granted to the appropriate internal mapper DB objects. The class includes the following public methods: get_static_line, get_device_id, get_open_phone, get_next, get_phonecaps and get_siemens_data.

The method get_static_line obtains the associated static line object. The get_device_id method obtains the associated device ID. The get_open_phone method obtains the associated open phone object. The get_next method obtains the next static phone device in the list of static phone devices. The get_phonecaps method obtains the TAPI PHONECAPS object associated with this object. The get_siemens_data method obtains the Siemens data object associated with this object.

Class Static_Address

This object provides the routines needed to operate on a static address object. All constructors and the destructor are private methods with friend status granted to the appropriate internal mapper DB objects. Public methods include get_static_line, get_extension, get_next, get_lineaddresscaps, and get_siemens_data.

The get_static_line method obtains the associated static line object. The get_extension method obtains the associated extension number. The get_next method obtains the next static address in the list of static address objects. The get_lineaddresscaps method obtains the TAPI LINEADDRESSCAPS object associated with this object. The get_siemens_data method obtains the Siemens data object associated with this object.

Class Open_Device

The open_device class is a base class that both open_line and open_phone objects are derived from. The following methods are associated with the open_device class: get_device_type and get_object_type. The get_device_type method obtains the type of this object, i.e., whether it is an open line or an open phone. The get_object_id method obtains the unique ID of this object. This ID can be used later in the validate calls.

Class Open_Line

This object provides the routines needed to operate on an open line object. All constructors and the destructor are private methods with friend status granted to the appropriate internal mapper DB objects. Public methods include get_static_line, set_event_callback, get_event_callback, set_tapi_handle, get_tapi_handle, set line_states, get_line_states, set_address_states, get_address_states, get_address, get_address_id, get_open_phone, get_next, get_linedevstatus, get_devspecific_data, and get_siemens_data.

The get static_line method obtains the associated static line object The set_event_callback method sets the TAPI defined event function callback pointer. The get_event_callback method returns the previously saved function callback pointer. The set_tapi_handle method sets the TAPI line handle. The get_tapi_handle method returns the previously saved TAPI line handle. The set_line_states method sets the line state message mask. The get_line_states method returns the line state message mask. The set_address_states method sets the address state message mask. The get_address_states method returns the address state message mask. The get_address method obtains the first associated address object in the address list. The get_address_id method obtains the associated address ID. The get_open_phone method obtains the associated open phone object. The get_next method obtains the next open line in the list of open line objects. The get_linedevstatus method obtains the TAPI LINEDEVSTATUS object associated with this object. The get_devspecific_data method obtains the device specific data object associated with this object. The get_siemens_data method obtains the Siemens data object associated with this object.

Class Open_Phone

This object provides the routines needed to operate on an open line object. All constructors and the destructor are private methods with friend status granted to the appropriate internal mapper DB objects. Public methods include get_static_phone, set_event_callback, get_event_callback, set_tapi_handle, get_tapi_handle, set_phone_states, get_phone_states, get_open_line, get_next, get_phonestatus, get_devspecific_data, and get_siemens_data.

The get_static_phone method obtains the associated static phone object. The set_event_callback method sets the TAPI defined event function callback pointer. The get_event_callback method returns the previously saved function callback pointer. The set_tapi_handle method sets the TAPI phone handle. The get_tapi handle method returns the previously saved TAPI phone handle. The set_phone_states method sets the phone state message mask. The get_phone_states method returns the phone state message mask. The get_open_line method obtains the associated open line object. The get_next method obtains the next open phone in the list of open phone objects. The get_phonestatus method obtains the TAPI PHONESTATUS object associated with this object. The get_devspecific_data method obtains the device specific data object associated with this object. The get_siemens_data method obtains the Siemens data object associated with this object.

Class Address

This object provides the routines needed to operate on an address object. All constructors and the destructor are private methods with friend status granted to the appropriate internal mapper DB objects. The class includes the following public methods: get_open_line, get_call, get_old_call, get_extenstion, get_next, get_lineaddressstatus, and get_siemens_data.

The get_open_line method obtains the associated open line object. The get_call method obtains the associated first call object in the list of call objects. The get_old_call method obtains the associated first call object in the list of old call objects. The get_extension method obtains the associated extension number. The get_next method obtains the next address in the list of address objects. The get_lineaddressstatus method obtains the TAPI LINEADDRESSSTATUS object associated with this object. The get_siemens_data method obtains the Siemens data object associated with this object.

Class Call

This object provides the routines needed to operate on a call object. All constructors and the destructor will be private methods with friend status granted to the appropriate internal mapper DB objects. Public methods include get_address, get_address_id, set_tapi_handle, get_tapi_handle, get_object_id, get_next, get_linecallinfo, get_linecallstatus, and get_siemens_data.

The get_address method obtains the associated address object. The get_address_id obtains the associated address ID. The set tapi_handle method sets the TAPI call handle. The get_tapi_handle method returns the previously saved TAPI call handle. The get_object_id method obtains the unique ID of this object This ID can be used later in the validate calls. The get_next obtains the next call in the list of call objects. The get_linecallinfo method obtains the TAPI LINECALLINFO object associated with this object The get_linecallstatus method obtains the TAPI LINECALLSTATUS object associated with this object The get_siemens_data method obtains the Siemens data object associated with this object.

Class Request_ID

This object provides the routines needed to operate on a request ID object All constructors and the destructor will be private methods with friend status granted to the appropriate internal mapper DB objects. Public methods include get_open_device, get_call, and get_next.

The get_open_device method obtains the associated open line or open phone object. The get_call method obtains the associated call object. The get_next method obtains the next request ID in the list of request ID objects.

Data Area Objects

The creation, deletion and general management of these objects is internal to the mapper DB. However, these objects are logically an extension of the TAPI telephony objects and represent both TAPI data structures and internal TSP data structures that are related to a specified TAPI telephony object. This data is managed by users of the mapper DB via both methods and direct data access.

Data area objects represent three different categories: TAPI data structures, device specific data structures and internal data. Objects that represent TAPI data structures allow direct access, via public data, of the exact TAPI data structure that they represent. An exception is variable length fields which is managed via get and set methods. Objects that represent device specific data structures allow direct access, via public data, of the exact device specific structures found in the TSP. There is no variable length data in these structures. Objects that represent specific information are defined as the request response and event mapper.

What is claimed is:

1. A TAPI system, comprising:

a TAPI application program;

a TAPI service provider; and a telephony database for managing a plurality of manager objects and a plurality of managed objects, the managed objects including telephony objects defining a class hierarchy.

2. A TAPI system according to claim 1, said plurality of manager objects maintaining a free list and an in use list.

3. A TAPI system comprising:

a database system including a plurality of manager objects; and a plurality of objects being managed by said manager objects;

said database useable by a TAPI service provider for managing said objects.

4. A TAPI system according to claim 3, said manager objects including at least one phone device manager object, line device manager object, open phone manager object, open line manager object, request ID manager object, open line manager object, or call manager object.

5. A TAPI system according to claim 4, said objects including at least one static phone device object, static line device object, open phone object, open line object, request ID object or call object.

6. A TAPI service provider, comprising:

a telephony database, said telephony database configured to model a plurality of manager objects and manage a plurality of telephony-related objects for use by said TAPI service provide.

7. A TAPI service provider according to claim 6, said manager objects including at least one phone device manager object, line device manager object, open phone manager object, open line manager object, request ID manager object, open line manager object, or call manager object.

8. A TAPI service provider according to claim 7, said telephony-related objects including at least one static phone device object, static line device object, open phone object, open line object, request ID object or call object.

9. A TAPI system, comprising:

a TAPI application program;

a TAPI service provider; and a telephony database for use by said TAPI service provider, said telephony database including
one or more database applications programming interfaces;
a TAPI builder,
at least one request mapper;
at least one response mapper; and
at least one event mapper.

10. A TAPI system as recited in claim 9, wherein said at least one request mapper, at least one response mapper, and at least one event mapper are adapted to perform one or more actions on said mapper database, including creation/deletion and opening/closing of TAPI telephony objects.

* * * * *